Aug. 12, 1958 P. E. SHAFER 2,847,619
ELECTRICAL DEVICE
Filed June 1, 1954
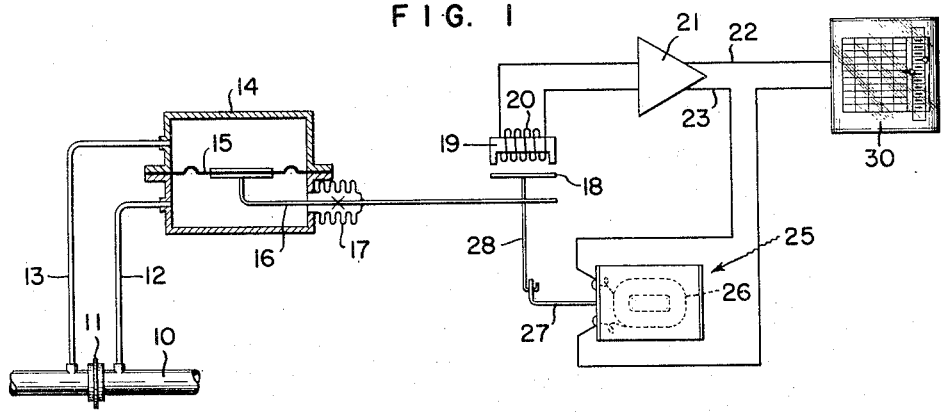
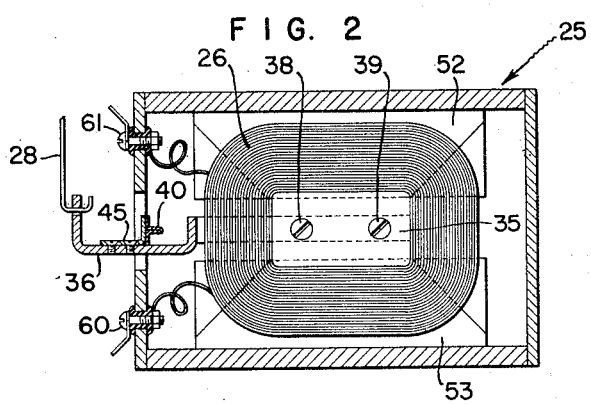
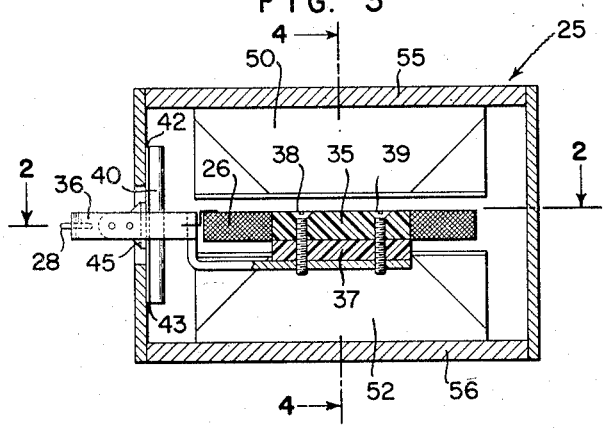
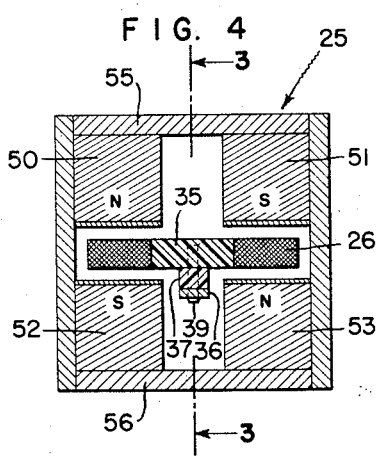
*INVENTOR.*
PHILIP E. SHAFER
BY *Arthur H. Lukinson*
ATTORNEY.

United States Patent Office 2,847,619
Patented Aug. 12, 1958

2,847,619

ELECTRICAL DEVICE

Philip E. Shafer, Philadelphia, Pa., assignor to Minneapolis-Honeywell Regulator Company, Minneapolis, Minn., a corporation of Delaware Application June 1, 1954, Serial No. 433,505

9 Claims. (Cl. 317—166)

A general object of the present invention is to provide a new and improved electrical apparatus for producing an output force which is proportional to an applied electrical current signal. More specifically, the present invention is concerned with an improved electric current to force transducer which is characterized by its high output torque characteristics, its simplicity, its compactness, and its rugged constructional features.

In certain types of measuring apparatus of the type producing an output force proportional to the magnitude of a variable to be measured, it has been found desirable to provide some means for force balancing the input signal force. An effective form of force balancing means may be constructed by using a movable coil which has a current flowing therethrough and which is positioned in the proximity of a magnetic field so as to be deflected by the interaction of the field from the coil with the magnetic field. A basic form of a current deflected coil will be found in the D'Arsonval galvanometer. However, the D'Arsonval galvanometer is generally formed so that it moves the output coil through a relatively large angle and it is not adapted for producing a high output force or torque. Another form of force producing device which has been used in the prior art is a flattened circular coil which is positioned in a magnetic field so as to move at right angles with respect to the field. One of the difficulties of apparatus of this type is that the current flowing in the circular coil in reacting with the magnetic field does not produce a net resultant force which acts uniformally in the same general direction but a plurality of forces with only an infinitesimal increment of the forces acting in the direction which is useful in a force balancing function.

The present invention overcomes the shortcomings of the prior art types of electric force producing units by providing a coil construction which permits maximum output force from the coil of the apparatus by arranging the coil in a magnetic field so that the resultant force produced by the interaction of a current produced field in the coil with the magnetic field is in substantially a single direction. In addition, this apparatus has been formed in the present invention so that it is extremely simple in its assembly, it is rugged, and is formed of a minimum of parts.

It is therefore a more specific object of the present invention to provide an improved electric to force transducer in the form of a coil reacting with a magnetic field with a resultant interaction of forces between the coil produced field and the magnetic field being in a substantially fixed single direction.

Another more specific object of the present invention is to provide a flattened electrical coil of elongated construction with the elongated portion of the coil being placed in a magnetic field with the magnetic field reacting with the coil produced field to provide a resultant force which acts in a substantially fixed direction.

Still another more specific object of the present invention is to provide an improved electrical apparatus providing an electrical coil mounted on a supporting member which is pivoted by means of a torsion angle pivot so as to enhance the ease of manufacture of the apparatus and provide a resultant structure which is inherently rugged in nature.

The various features of novelty which characterize the invention are pointed out with particularlity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 represents a schematic showing of a measuring apparatus which may include the present invention as a force balancing element;

Fig. 2 is a plan-section view of the force producing element;

Fig. 3 is a side view of the force producing unit; and

Fig. 4 shows a cross-sectional view of Fig. 3 taken along the section line 4—4 of Fig. 3.

Referring first to Fig. 1, there is shown a schematic form of flow measuring apparatus which apparatus is representative of numerous types of measuring apparatus employing the principle of using a variable to produce a reaction force upon a pivoted beam with the force being force balanced by a suitable feedback force producing device. In Fig. 1, the numeral 10 represents a flow line through which is flowing a fluid whose rate of flow is to be measured by the apparatus shown in the figure. An orifice plate 11 is placed within the line and the differential pressure across the orifice plate is picked off by a pair of pressure transmitting conduits 12 and 13. These conduits are connected to a chamber 14 having a diaphragm 15 therein. The difference in pressures between the pressure acting on the top side of the diaphragm 15 and that acting on the lower side of the diaphragm will cause a displacement of a pivoted beam 16 which passes through the lower portion of the chamber 14 through a sealing bellows 17. The deflection of the beam 16 is detected by the motion of a plate 18 relative to an iron core 19 having a coil 20 wound thereon. The coil 20 may be used to vary the tuning of an oscillator 21, which has the coil on the input thereof. The output current of the oscillator 21 will be proportional to the motion of the member 18 relative to the coil 20. Its output current flowing in leads 22 and 23 will be proportional to the fluid flow in the conduit 10. The output current flow is used to force balance the pivoted beam 16 by means of a force balancing unit 25. This unit includes a coil 26 acting on a supporting member 27 and a connecting link 28 to force balance the pivoted beam 16. The output current also flows to a suitable indicating and recording instrument shown generally at 30.

In considering the operation of the apparatus of Fig. 1 it will be noted that with a particular fluid flow through the conduit 10, there will be a predetermined pressure difference on the diaphragm 15 to displace the pivoted beam 16. The displacement of the beam will be detected by the member 18 and the coil 20 and the oscillator 21 will have an output current proportional to this deflection. The output current from the oscillator will pass through the force balancing coil 26 which, acting through the supporting member 27 and connecting link 28, will provide a balancing force on the beam 16 so that the resultant current flow in the output leads 22 and 23 passing to the indicating instrument 30 will be proportional to the fluid flow in the conduit 10.

The details of the force balancing unit 25 are shown in Figs. 2, 3, and 4. Referring to these figures, it will be seen that the coil 26 is wound upon a suitable bobbin member 35 which may be formed of Bakelite or other non-magnetic material. After the coil has been wound upon the bobbin 35, the coil may conveniently be impregnated with a suitable epoxyresin. A suitable resin may be "Araldite 115" which may be purchased commercially.

The bobbin 35 is carried by a pivoted supporting arm 36. The bobbin 35 is spaced from the supporting arm 36 by a spacing member 37. The bobbin 35 and the spacing member 37 have holes passing therethrough so that a pair of fastening screws 38 and 39 may be passed therethrough to engage suitable threading in the supporting arm 36. The pivoted supporting arm 36 is carried by a torsion angle pivot 40 which is formed of a resilinet material and has a T cross-section, as viewed in Fig. 2. The outer ends of the angle pivot 40 are firmly fastened to a supporting end plate 41 at 42 and 43. A suitable bracket 45 serves as a connecting means between the torsion angle pivot 40 and the arm 36.

The magnetic field for the force producing unit 25 is produced by a plurality of permanent magnet units 50, 51, 52, and 53. These units are best shown in Fig. 4 where they are shown in cross-section with their area being slightly larger than the cross-sectional area of the coil 26 to insure that when the coil moves, it will remain within the magnetic field created by the permanent magnets. The face of each magnet is covered with a suitable soft iron facing which tends to cause the magnetic field across the gap to be uniform.

As viewed in Figs. 2 and 3, it will be noted that the ends of the magnetic members are shaped with a larger cross-section near the base of the magnet adjacent their supporting members 55 and 56. The reduced cross-section has the effect of providing a uniform magnetic field per unit cross-section of the magnet so as to compensate for the loss of magnetic flux due to leakage between the adjacent magnets 50 and 51, and 52 and 53. In addition, the face of the magnets are shaped so as to concentrate the magnetic flux along the elongated sides of the coil 26.

When the apparatus is connected to a circuit such as shown in Fig. 1, electrical current will pass in through the input terminals 60 and 61 to the coil 26. The current flowing through the coil will produce a flux field which reacts with the magnetic field produced by the permanent magnets 50—53 and the coil 26 will be deflected at right angles to the principal flux field of the permanent magnets. The movement of the coil is restricted in that the arm 36 and the spacing member 37 ride between the permanent magnets 52 and 53. In one form of the apparatus the motion of the unit was restricted to approximately 4°. This is not objectionable in a device of the present type in that it is desired that it produce a high output torque through a relatively small angle. This characteristic makes the apparatus very suitable for use in apparatus of the type shown in Fig. 1 wherein a high balancing force may be required on the pivot beam 16 while the actual motion of the beam is very small. It will also be readily apparent that the apparatus is very rugged in construction in that the only moving portion is the coil and there is no frictional problem in that the apparatus is supported by a torsional pivot which introduces substantially no loading on the apparatus in the small angle where the apparatus is operative.

It will also be apparent that the form of apparatus shown has a maximum of active magnetic material acting directly around the coil 26 which permits the obtaining of a high torque. By using the improved forms of Alnico magnet in the device the overall size of the device may be considerably reduced so that the final device is very compact.

While, in accordance with the provisions of the statutes, there is illustrated and described a preferred embodiment of the invention, those skilled in the art will understand that changes may be made in the form of the apparatus disclosed without departing from the spirit of the invention as set forth in the appended claims, and that some features of the present invention may be used to advantage without a corresponding use of other features.

Having now described the invention, what is claimed as new and for which it is desired to secure Letters Patent is:

1. In an electric to force transducer, the combination comprising, a flattened planar electrical coil formed to have sides which are elongated compared to the length of the ends, and magnetic field producing means positioned relative to said coil to provide a concentrated magnetic field along the elongated sides of said coil so that a maximum unidirectional force in the plane defined by said coil will be produced by the interaction of an electric current in said coil with the magnetic field of said last named means.

2. Electrical apparatus comprising a flattened planar electrical coil having a pair of parallel elongated sides, a pivoted supporting means fastened to said coil and extending to a pivot beyond the area of said coil along an axis parallel to the elongated sides of said coil, said pivot extending in a line perpendicular to the plane defined by said coil and a magnetic field producing means having a planar air gap formed by a plurality of pairs of magnetic pole faces extending along said elongated sides and shaped to concentrate a magnetic field only along the elongated sides of said coil, said coil being adapted for transverse planar movement in said air gap about said pivoted supporting means.

3. Apparatus as defined in claim 2 wherein said magnetic field producing means comprises four permanent magnets, two of which are placed with dissimilar poles adjacent and on opposite sides of one of said elongated sides and the other two of which are placed with dissimilar poles adjacent and on the opposite side of the other of said elongated sides so that the reaction forces between the sides of said coils and the associated permanent magnets are in a single direction.

4. Electrical apparatus comprising, a flattened elongated planar bobbin member formed of non-magnetic material, a wire wound peripherally around the edge of said bobbin member to form a flat coil whose principal plane is coincident with the flat plane of said bobbin, said coil being impregnated with a resin to cause said coil to retain its shape when formed, a supporting member for said bobbin and coil, said supporting member having a pivot adjacent one end thereof and being fastened to said bobbing member at the other end thereof, said pivot extending in a line perpendicular to the plane defined by said coil and bobbin, and means positioned adjacent said coil for producing a magnetic field whose flux lines are concentrated on the elongated sides of the said coil, said coil being adapted for transverse planar movement with respect to the flux lines of the magnetic field.

5. Apparatus as defined in claim 4 wherein said pivot comprises a resilient angle beam mounted at its ends on a supporting frame and at its center to said supporting member.

6. Apparatus as defined in claim 4 wherein said means for producing a magnetic field comprises a pair of permanent magnet members positioned relative to said coil so that the flux lines thread the elongated sides of said coil at right angles to the principal flattened plane of said coil.

7. Apparatus as defined in claim 6 wherein said permanent magnet members have pole faces covered with soft iron members.

8. In an electric-to-force transducer, the combination comprising a flattened planar electrical coil having two opposite sides which are long relative to the ends of said coil, magnet means defining a pair of parallelly extending magnetic fields of opposite polarity with respect to each other, and means for supporting said coil relative to said field defining means wherein one of said long sides is positioned in one of said pair of fields and the other of said long sides is positioned in the other of said fields, said coil being supported for pivotal movement in the plane defined by said coil and transverse to the fields defined by said magnet means, said movement being responsive to the interaction of said fields and electric current signals applied to said coil.

9. In an electric-to-force transducer, the combination comprising a flattened planar electrical coil having two opposite sides which are long relative to the ends of said coil, magnet means defining a pair of parallelly extending magnetic fields of opposite polarity with respect to each other, and means for supporting said coil relative to said field defining means wherein one of said long sides is positioned in one of said pair of fields and the other of said long sides is in the other of said fields, said supporting means including a resilient torsion pivot extending perpendicularly of the plane defined by said coil through a point remote from said coil whereby said coil is supported for pivotal movement in the plane defined by said coil and transverse to the fields defined by said magnet means, said movement being responsive to the interaction of said fields and electric current signals applied to said coil.

References Cited in the file of this patent
UNITED STATES PATENTS

| | | |
|---|---|---|
| 2,076,879 | Carton | Apr. 13, 1937 |
| 2,691,142 | Richardson | Oct. 5, 1954 |